United States

Kulle et al.

[11] 3,877,794
[45] Apr. 15, 1975

[54] PLASTIC LENS MOUNTING FOR VARIFOCAL OBJECTIVE

[75] Inventors: Elfriede Kulle, Waake; Rolf Meyer, Gottingen, both of Germany

[73] Assignee: ISCO Optische Werke GmbH Gottingen, Gottingen, Germany

[22] Filed: Nov. 12, 1973

[21] Appl. No.: 414,826

[30] Foreign Application Priority Data
Nov. 10, 1972 Germany............................ 2255048

[52] U.S. Cl. ............................................. 350/187
[51] Int. Cl. ............................................. G02b 7/10
[58] Field of Search ..................................... 350/187

[56] References Cited
UNITED STATES PATENTS
3,582,188  6/1971  Rau et al. ..................... 350/187 X
3,748,024  7/1973  Rodier et al. ................... 350/187 X

*Primary Examiner*—Archie R. Borchelt
*Attorney, Agent, or Firm*—Karl F. Ross; Herbert Dubno

[57] ABSTRACT

A stationary outer lens barrel slidably receives a movable inner lens barrel serving to support two axially displaceable components of a varifocal objective in interleaved relationship with two fixed components supported in the outer lens barrel. One of the fixed components, i.e. the rearmost component of the four-component varifocal group, is seated on a fixed internal abutment of the outer lens barrel; the other fixed component, i.e. the second from the front, is carried on an insert which is guided in axial wall slots of the inner lens barrel and is snapped into recesses on the inner wall surface of the outer lens barrel before the movable front lens is positioned in its seat on the inner lens barrel.

10 Claims, 4 Drawing Figures

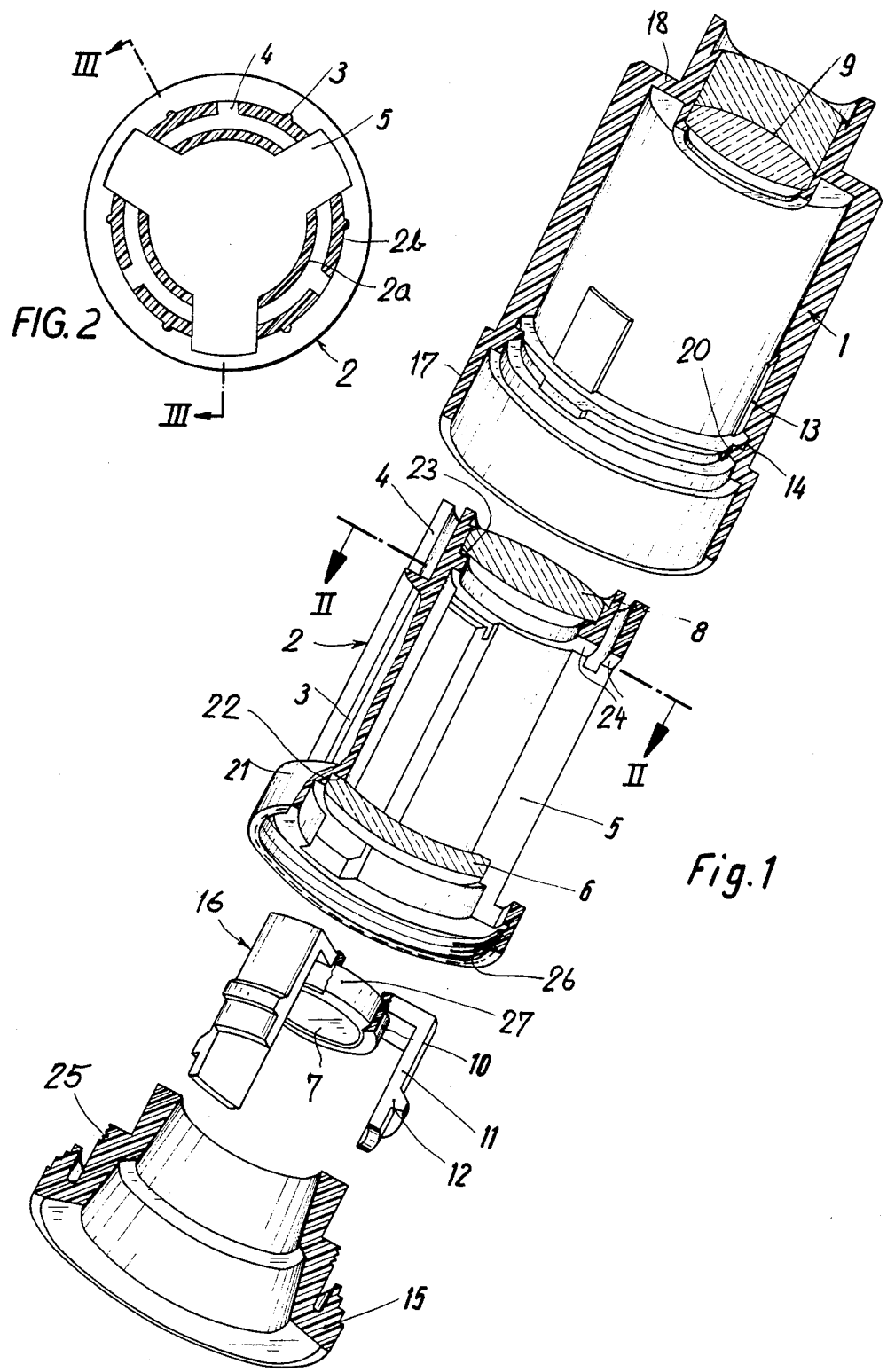

3,877,794

PLASTIC LENS MOUNTING FOR VARIFOCAL OBJECTIVE

FIELD OF THE INVENTION

Our present invention relates to a mounting for a plurality of lenses which are relatively movable in axial direction, more particularly for a pair of fixed components and a pair of axially movable components forming part of a varifocal lens group.

BACKGROUND OF THE INVENTION

Varifocal lens groups of this description are frequently designed as separate attachments for a basic objective in a camera or a projector, the relative slidability of the fixed and movable components thereof serving to vary the overall focal length of the resulting system. In cases where the two movable components are bracketed by the two fixed components, the position of the stationary front lens may be limitedly adjustable for focusing purposes. In other instances, especially with a movable front component, focusing may be accomplished by an axial shift of the entire group.

OBJECTS OF THE INVENTION

The general object of our present invention is to provide a lens mounting for such a varifocal group which is of simple construction, may be mass-produced from plastic material by injection molding, and can be conveniently assembled.

A more particular object is to provide a mounting specifically designed for a four-component varifocal group whose first and third components (counted from the front or object side of the system) are movable while its second and fourth components are stationary, with bodily mobility of the entire group for focusing purposes as mentioned above.

SUMMARY OF THE INVENTION

We realize these objects, in conformity with our present invention, by the provision of two nested and relatively axially slidable lens barrels, i.e. an outer lens barrel with a rear end forming a seat for the fourth component and an inner lens barrel forming two axially spaced seats for the first and third components of the group; an insert, comprising a central ring with a plurality of axially extending legs peripherally secured thereto, forms a seat for the stationary second component, the legs of this insert being slidably received in peripherally spaced wall slots of the inner lens barrel extending axially from the front end thereof. The insert, with its second component, is introduced into the inner lens barrel through its open front end before the first component is emplaced; upon subsequent immobilization of that insert with reference to the outer lens barrel by suitable fastening means, this first component is placed on its seat and secured in position on the inner lens barrel by suitable means, preferably by a detachable head threadedly secured to a front flange of that barrel.

The immobilization of the insert advantageously is achieved by aligning the wall slots of the inner lens barrel with respective recesses on the inner wall surface of the outer lens barrel and letting projections on the legs of the insert snap into these recesses behind overhanging shoulders provided at their forward ends.

BRIEF DESCRIPTION OF THE DRAWING

The above and other features of our invention will now be described in detail with reference to the accompanying drawing in which:

FIG. 1 is an exploded perspective view, with parts broken away, of the several constituents of a lens mounting according to our invention;

FIG. 2 is a cross-sectional view taken on the line II—II of FIG. 1;

SPECIFIC DESCRIPTION

Figure 3:
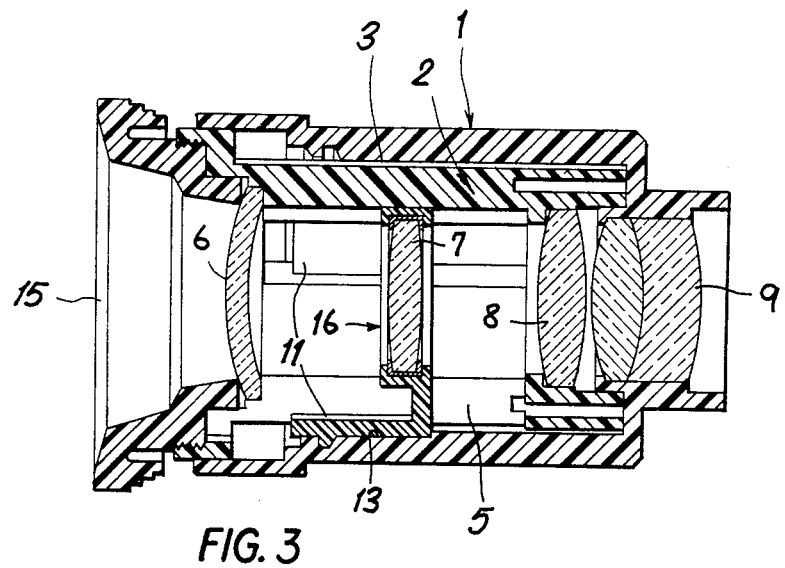
FIG. 3 is an axial sectional view of the assembled lens mounting in one extreme working position, taken on the line III—III of FIG. 2.

The lens mounting shown in the drawing consists of an outer lens barrel 1, an inner lens barrel 2, and insert 16 fitting into the latter lens barrel, and a head 15 threadedly engageable with the same lens barrel. All these constituents are made from plastic material by conventional injection molding.

The outer lens barrel 1 has a solid peripheral wall, of generally cylindrical configuration, with an enlarged forward extension 17 and with a rear wall 18 forming a seat for a compound lens 9 representing the fourth or rearmost component of a varifocal lens group as described above. The inner wall surface of barrel 1 is provided, at locations peripherally spaced apart by 120°, with shallow recesses 13 of limited axial length, each recess terminating at its front in a transverse notch 14 overhung by a shoulder 20. In the assembled condition of the unit, illustrated in FIGS. 3 and 4, longitudinal slots 5 in the wall of inner lens barrel 2 are respectively aligned with the recesses 13; these wall slots extend rearwardly from a peripheral front flange 21 of barrel 2 whose outer diameter exceeds the inner diameter of barrel 1. Flange 21 is peripherally recessed at 22 to form a seat for a lens 6 serving as the first component of the varifocal group. Another lens 8, constituting the third component of that group, is fixedly held in a seat 23 at the rear end of lens barrel 2. The wall of this lens barrel is split in the region of lens 8 into an inner ring 2a and an outer ring or skirt 2b, the two rings being partly divided into segments by the slots 5 which terminate at section line II—II, i.e. at the level of the forward face of seat 23, to form end stops 24 engageable with the insert 16 in an extended position (FIG. 4) of barrel 2. The skirt 2b is further subdivided by longitudinal slots 4 midway between channels 5. This subdivision results in the formation of three pairs of arcuate flaps which are inherently biased outwardly toward the wall of the surrounding lens barrel 1; longitudinal ribs 3, extending over the full length of the cylindrical outer peripheral wall of lens barrel 2 including the skirt 2b, define limited zones of surface contact between the two lens barrels to facilitate their relative axial displacement between the retracted position of FIG. 3 and the extended position of FIG. 4.

Insert 16 comprises a central ring 10 and three peripherally spaced legs 11 which are generally L-shaped, their shorter radial portions serving to secure their longer axial portions to the ring. These axial portions are slidably received in the slots 5 of barrel 2 and, upon assembly, enter the respective recesses 13 of barrel 1. Such assembly occurs before emplacement of the front lens 6, thus enabling the insert 16 to be driven rearwardly until stops 12 on its legs 11 snap into the transverse notches 14 of the associated recesses 13. This immobilizes the insert 16, together with a lens 7 mounted in its ring 10, with reference to the outer barrel 1. Thereafter, lens 6 is put into place on its seat 22 whereby lens 7 is sandwiched between lenses 6 and 8 as the second component of the group.

Figure 4:
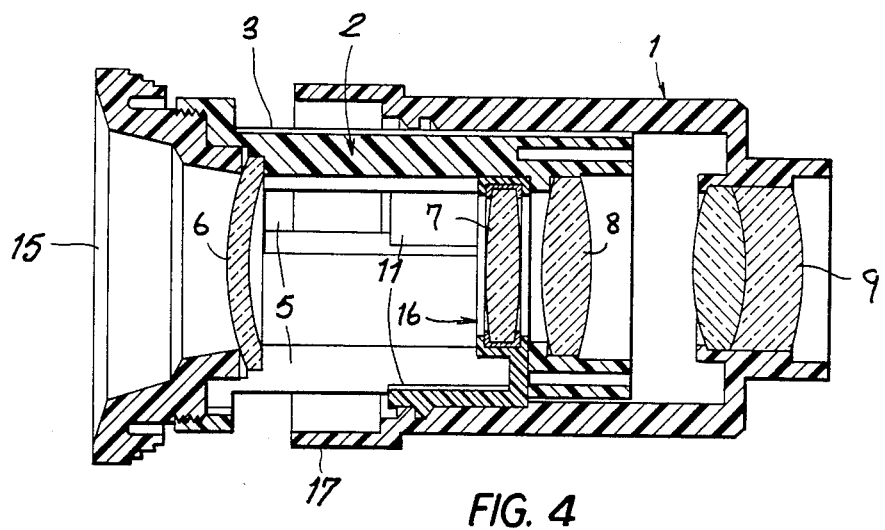
FIG. 4 is a view similar to FIG. 3, showing the assembly in its other extreme working position.

To complete the assembly, and to lock the lens 6 in position, head 15 is screwed into flange 21 by means of male threads 25 engaging complementary female threads 26 of that flange. The head 15 then also serves as a convenient means for axially shifting the lens barrel 2 with its movable components 6 and 8 relatively to the lens barrel 1 with its stationary components 7 and 9; the engagement of legs 11 with slots 5 and recesses 13 prevents relative rotation of the two lens barrels. In the position of FIG. 4, the stops 24 forming the rear ends of slots 5 come to rest against the radial portions of legs 11.

The entire assembly, shown in FIGS. 3 and 4, may be inserted into a bore of a nonillustrated objective holder such as, for example, a projector housing. To facilitate focusing, the outer wall surface of lens barrel 1 may be helically threaded to mate with complementary threads on the holder.

The described lens mounting requires no aftertreatment following the molding operation, nor additional hardware for securing the lenses in position. The material used for its parts may be suitably pigmented to give a mat-black appearance, thereby minimizing reflections at the inner wall surfaces; this latter feature has been claimed in a commonly owned application, filed on even date herewith by Lothar HUMMEL, which also shows the threading of a molded lens barrel into a holder therefor.

Naturally, the plastic material used especially for the insert 16 should have sufficient elasticity to facilitate the aforedescribed snap-action assembly. The lenses, or some of them, could be provided with metallic retaining rings as indicated at 27 for component 7.

We claim:

1. A mounting for a four-component varifocal lens group including a movable first component, a fixed second components, a movable third component and a fixed fourth component, comprising:

an outer lens barrel with a rear end forming a seat for said fourth component, said outer lens barrel having an inner wall surface with a plurality of peripherally spaced recesses bounded at the front by overhanging shoulders;

an inner lens barrel slidably telescoped in said outer lens barrel, said inner lens barrel forming two axially spaced seats for said first and third components and being provided with a plurality of peripherally spaced wall slots in line with said recesses extending axially from a front end thereof;

an insert comprising a central ring with a plurality of axially directed legs with forwardly extending free ends peripherally secured to said ring, said legs being received in said wall slots and in the recesses of said outer lens barrel aligned therewith, said ring forming a seat for said second component; and fastening means for immobilizing said insert with reference to said outer lens barrel, said fastening means including outer projections on said legs near their free ends received with a snap fit in said recesses in contact with said shoulders.

2. A mounting as defined in claim 1 wherein said inner lens barrel is provided with a peripheral front flange having an outer diameter larger than the inner diameter of said outer lens barrel, said wall slots terminating at said flange.

3. A mounting as defined in claim 2, further comprising a stepped annular head threadedly secured to said flange, said head projecting forwardly from said outer lens barrel to facilitate manipulation of said inner lens barrel.

4. A mounting as defined in claim 3 wherein said head coacts with the more forward one of said axially spaced seats to lock said first component in position.

5. A mounting as defined in claim 3 wherein said lens barrels, said insert and said head consist of plastic material.

6. A mounting as defined in claim 1 wherein said inner lens barrel is provided with a set of external longitudinal ribs contacting the inner wall surface of said outer lens barrel to facilitate relative sliding.

7. A mounting as defined in claim 6 wherein said inner lens barrel has a rearwardly facing skirt with peripheral slits dividing same into outwardly biased segments, said ribs extending over said segments.

8. A mounting as defined in claim 7 wherein said slits are peripherally interleaved with said ribs.

9. A mounting as defined in claim 1 wherein said legs are substantially L-shaped and have radially extending portions secured to said ring.

10. A mounting as defined in claim 9 wherein slots terminate in stops engageable by said radially extending portions in an extended position of said inner lens barrel.

* * * * *